(12) United States Patent
Takeda et al.

(10) Patent No.: US 7,891,829 B2
(45) Date of Patent: Feb. 22, 2011

(54) BACKLIGHTED KEYBOARD AND METHOD USING PATTERNED LIGHT GUIDE

(75) Inventors: Toshisada Takeda, Simi Valley, CA (US); Satoshi Kawashima, Fukuroi (JP); Junji Yuasa, Fukuroi (JP); Yohei Ishii, Yokohama (JP)

(73) Assignee: Minebea Co., Ltd. (JP)

( * ) Notice: Subject to any disclaimer, the term of this patent is extended or adjusted under 35 U.S.C. 154(b) by 354 days.

(21) Appl. No.: 12/106,215

(22) Filed: Apr. 18, 2008

(65) Prior Publication Data

US 2009/0067153 A1 Mar. 12, 2009

Related U.S. Application Data

(60) Provisional application No. 60/912,834, filed on Apr. 19, 2007.

(51) Int. Cl.
*F21V 33/00* (2006.01)
(52) U.S. Cl. .......................... 362/85; 362/602; 362/619; 362/612; 200/314
(58) Field of Classification Search .................... 362/85, 362/600, 602, 603, 612, 613, 615, 617, 619, 362/620, 631, 330; 200/310, 314, 317
See application file for complete search history.

(56) References Cited

U.S. PATENT DOCUMENTS

| | | | |
|---|---|---|---|
| 4,636,593 | A | 1/1987 | Novak et al. |
| 5,432,684 | A | 7/1995 | Fye et al. |
| 5,491,313 | A * | 2/1996 | Bartley et al. ................ 200/314 |
| 5,521,342 | A * | 5/1996 | Bartley et al. ................ 362/602 |
| 6,198,677 | B1 | 3/2001 | Hsu et al. |
| 6,217,183 | B1 | 4/2001 | Shipman |
| 6,284,988 | B1 | 9/2001 | Watanabe et al. |
| 6,467,924 | B2 | 10/2002 | Shipman |
| 6,686,549 | B2 | 2/2004 | Douzono et al. |
| 6,860,612 | B2 | 3/2005 | Chiang et al. |
| 7,086,768 | B2 * | 8/2006 | Suwa et al. ................. 362/555 |

(Continued)

FOREIGN PATENT DOCUMENTS

JP  04-88623  7/1992

(Continued)

*Primary Examiner*—Bao Q Truong
(74) *Attorney, Agent, or Firm*—Kilpatrick Townsend & Stockton LLP (57) ABSTRACT

A keyboard apparatus. The apparatus has a housing including a plurality of key pads, including at least twenty six key pads spatially disposed within the housing. Each of the key pads is depressible upon touch by a user. An optically transparent circuit board is coupled to a backside of each of the key pads. The apparatus has a light guide characterized by a planar optically transparent material having a surface region, a width, a length, and a backside region, and a thickness provided between the surface region and the backside region. The apparatus has a plurality of patterns disposed on the surface region and optically coupled respectively to each of the twenty six key members. In a specific embodiment, the apparatus has a light emitting diode provided within a center region of the surface region to emit electromagnetic radiation. The electromagnetic radiation propagates from the light emitting diode through a portion of the thickness of the light guide to one or more of the plurality of patterns to direct one or more portions of the electromagnetic radiation to respective key pads for lighting the respective key pads.

24 Claims, 10 Drawing Sheets

U.S. PATENT DOCUMENTS

| | | |
|---|---|---|
| 7,172,302 B1 | 2/2007 | Dittus |
| 7,193,536 B2 | 3/2007 | Shipman |
| 2007/0063978 A1 | 3/2007 | Cathey |

FOREIGN PATENT DOCUMENTS

| | | |
|---|---|---|
| JP | 05-128934 | 5/1993 |
| JP | 07-319594 | 12/1995 |
| JP | 10-188718 | 7/1998 |
| JP | 11-039983 | 2/1999 |
| JP | 11-039984 | 2/1999 |
| JP | 2002-251937 | 9/2002 |
| TW | 090129698 | 11/2001 |

* cited by examiner

BACKLIGHTED KEYBOARD AND METHOD USING PATTERNED LIGHT GUIDE

CROSS-REFERENCES TO RELATED APPLICATIONS

This application claims priority to U.S. Provisional Patent Application No. 60/912,834, filed Apr. 19, 2007, commonly assigned and incorporated herein by reference for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to computing devices. More particularly, the invention provides a keyboard apparatus and related methods having a backlighting characteristic for lighting one or more keys. Merely by way of example, the invention has been applied to a keyboard apparatus for a desk top computer, although it can also be applied to a laptop computer, modular computer, and other computing devices.

Computing devices have proliferated. In the early days, large mainframe computers dominated the computing landscape. These large mainframe computers were developed by companies such as IBM Corporation of Armonk, N.Y. Mainframe computers have been replaced, at least in part, by smaller computing devices, commonly known as "PCs." PCs come in various shapes and sizes. PCs are often run using computer software such as XP™ from Microsoft Corporation from Redmond Wash. Other types of computer software come from Apple Computer of Cupertino, Calif. Smaller PC versions are often called "lap top computers." Other types of PCs include larger desktop versions. Still other versions of PCs can be found in smaller devices such as personal digital assistants, called PDAs, cellular phones, and a variety of other applications.

All of these computing devices generally require input devices for human users to interact with them. As merely an example, computer keyboards are most commonly used as such input devices for inputting characters, numerals and symbols to electronic devices, particularly to these computing devices such as the PCs. While such keyboards are generally useful in lighted buildings, they may be difficult to use in a darker setting. As an example, such darker setting may be inside an airplane, which has been dimmed. Additionally, the larger setting may be in an unlighted building or other unlighted environment. To overcome these darker settings, certain keyboard devices have been lighted using various lighting techniques. These lighting techniques include use of individual light emitting diodes to emit light to individual key pads. Alternatively, light emitting crystals in the form of illuminating materials have been used to emit light to individual key pads. Various other techniques have been proposed.

As merely an example, a keyboard that uses backlighting is illustrated in U.S. Pat. No. 7,193,536 by Shipman (herein "Shipman"). FIG. 8 in Shipman discloses a keyboard housing 13; a plurality of key members 31, a biasing means (an elastic diaphragm 19) underlying said key members for biasing said key members in an upward direction, a substantially translucent circuit board 21 underlying said plurality of key members and said biasing means, and a luminescent planar sheet 49 for producing light. The luminescent planar sheet underlies the key members, the biasing means and the circuit board. Shipman requires use of an illuminating planar sheet, such as an electro-luminescent sheet using electroluminescent materials. In Shipman, luminescent planar sheet is an electroluminescent panel lamp, which requires a luminescent material sandwiched between a pair of electrodes. Shipman also uses multiple light pipes embedded in a keyboard housing to propagate light to the key members. Unfortunately, Shipman has limitations, which will be described throughout the present specification and more particularly below.

From the above, it is seen that techniques for improving keyboards for computing devices are highly desirable.

BRIEF SUMMARY OF THE INVENTION

According to the present invention, techniques for computing devices are provided. More particularly, the invention provides a keyboard apparatus and related methods having a backlighting characteristic for lighting one or more keys. Merely by way of example, the invention has been applied to a keyboard apparatus for a desk top computer, although it can also be applied to a laptop computer, modular computer, and other computing devices.

According to a specific embodiment, the invention provides a keyboard apparatus. The apparatus has a housing including a plurality of key pads, including at least twenty six key pads spatially disposed within the housing. Each of the key pads is depressible upon touch by a user. An optically transparent circuit board is coupled to a backside of each of the key pads. The apparatus has a light guide characterized by a planar optically transparent material having a surface region, a width, a length, and a backside region, and a thickness provided between the surface region and the backside region. In a specific example, the thickness is no greater than about 0.6 millimeters. In other examples, the thickness can be varied for different applications. The apparatus has a plurality of patterns disposed on the surface region and optically coupled respectively to each of the twenty six key members. In a specific embodiment, the apparatus has a light emitting diode provided within a center region of the surface region to emit electromagnetic radiation. The electromagnetic radiation propagates from the light emitting diode through a portion of the thickness of the light guide to one or more of the plurality of patterns to direct one or more portions of the electromagnetic radiation to respective key pads for lighting the respective key pads.

In a specific embodiment, the plurality of patterns includes a first pattern characterized by a first feature size at a first spatial distance from the light emitting diode and a second pattern characterized by a second feature size at a second spatial distance from the light emitting diode. In an embodiment, the first feature size directs a first portion of electromagnetic radiation, and the second feature size directs a second portion of electromagnetic radiation to cause a uniform distribution of light between the first pattern and the second pattern. In an embodiment, the center region excludes an edge region. In a specific embodiment, each of the plurality of patterns are selectively formed to emit electromagnetic radiation in a substantially uniform manner. For example, the electromagnetic radiation is characterized by a first intensity within a vicinity of the center region and a second intensity within a vicinity of an edge region, whereupon the first intensity is greater than the second intensity. The patterned regions are designed to compensate for the difference in light intensity to emit electromagnetic radiation in a substantially uniform manner. In some embodiments, the planar optically transparent material is a substantially plastic material. In an example, the planar optically transparent material is substantially acrylic plastic. In another example, the planar optically transparent material is substantially PMMA acrylic plastic. In yet another example, the planar optically transparent material is polycarbonate. According to embodiments of the invention, the light source includes light emitting diode (LED). In a particular example, the light emitting diode includes a plurality of light emitting diodes. In a specific embodiment, the keyboard includes a light source coupled to an edge region of the planar optically transparent material.

According to another embodiment of the invention, a method is provided for manufacturing a light guide for a keyboard apparatus. The method includes providing a planar optically transparent material having a surface region, a width, a length, a backside region, and a thickness provided between the surface region and the backside region. The method includes subjecting the one or more regions to be patterned to a plurality of particles to physically form one or more patterns on the one or more regions to be patterned and causing formation of the one or more patterns respectively having one or more dimple regions. In a specific embodiment, the pattern formation process is substantially free from any chemical reaction between the plurality of particles and the one or more regions to be patterned. The one or more dimple regions are configured to cause electromagnetic radiation traversing through a portion of the thickness to be emitted from the one or more patterns.

In another embodiment, the dimple formation methods discussed above can be used to form patterns of dimples on a rigid material. The patterned dimples in the rigid material are then used to form patterns of bumps the light guide. Merely as an example, a mold is made that includes patterns of dimples which can be made using the methods discussed above. Then a suitable light guide material, such as plastic, is melted and injected into the mode. As a result, patterns of bumps are formed in the light guide. In a alternative method, the dimpled rigid material can be pressed onto a plastic sheet, causing patterns of bumps on the plastic sheet. Of course, there can be other variations, modifications, and alternatives.

Many benefits are achieved by way of this invention. One or more benefits can be achieved in one or more of the embodiments.

1. An efficient planar light source including light emitting diode (LED) and transparent light guide.

2. A technique for a light guide for uniform keyboard backlight, including placement of the LED in a center region of the light guide and design of light emission patterns.

3. A backlighted keyboard that offers advantages of low cost and low power consumption In a specific embodiment, the method and apparatus may also be more efficient than conventional techniques. These and other benefits will be described in more detail throughout the present specification and more particularly below.

Various additional objects, features, and advantages of the present invention can be more fully appreciated with reference to the detailed description and accompanying drawings that follow.

DETAILED DESCRIPTION OF THE INVENTION

According to the present invention, techniques for computing devices are provided. More particularly, the invention provides a keyboard apparatus and related methods having a backlighting characteristic for lighting one or more keys. Merely by way of example, the invention has been applied to a keyboard apparatus for a desk top computer, although it can also be applied to a laptop computer, modular computer, and other computing devices.

As discussed above, a conventional backlighted keyboard was generally discussed in U.S. Pat. No. 7,193,536 by Shipman. An example of such backlighted keyboard in shown in FIG. 8 in Shipman, which requires use of an illuminating planar sheet, such as an electroluminescent sheet using electroluminescent materials, such as phosphor or organic light emitting devices (OLED). Unfortunately, the sheet has various limitations. For example, electroluminescent sheet requires AC electrical sources and usually suffers from high power consumption. To support the AC power requirement, a keyboard system needs a power converter and additional circuit sockets. The AC sources also tend to cause vibration. Moreover, electroluminescent sheets tend to be relatively expensive and have limited life time. Shipman also taught a preferred planar luminescent sheet that is constructed of a plurality of fiberoptic strands laid side-by-side to form a sheet. However, this method also has numerous limitations. For example, fiberoptic strands can be difficult to work with, and additional assembly is required to align the fiberoptic strands and to interface the fiber strands to the light sources. These requirements make Shipman's fiberoptic planar sheet relatively expensive. Therefore, an improved technique for lighted keyboards for computing devices is desired.

Depending upon the embodiment, the present invention includes one or more of various features, which may be used. These features include the following:
   1. An efficient planar light source including light emitting diode (LED) and transparent light guide.
   2. A technique for a light guide for uniform keyboard backlight, including placement of the LED in a center region of the light guide and design of light emission patterns.

3. A backlighted keyboard that offers advantages of low cost and low power consumption As shown, the above features may be in one or more of the embodiments to follow. These features are merely examples, which should not unduly limit the scope of the claims herein. One of ordinary skill in the art would recognize many variations, modifications, and alternatives.

Figure 1:
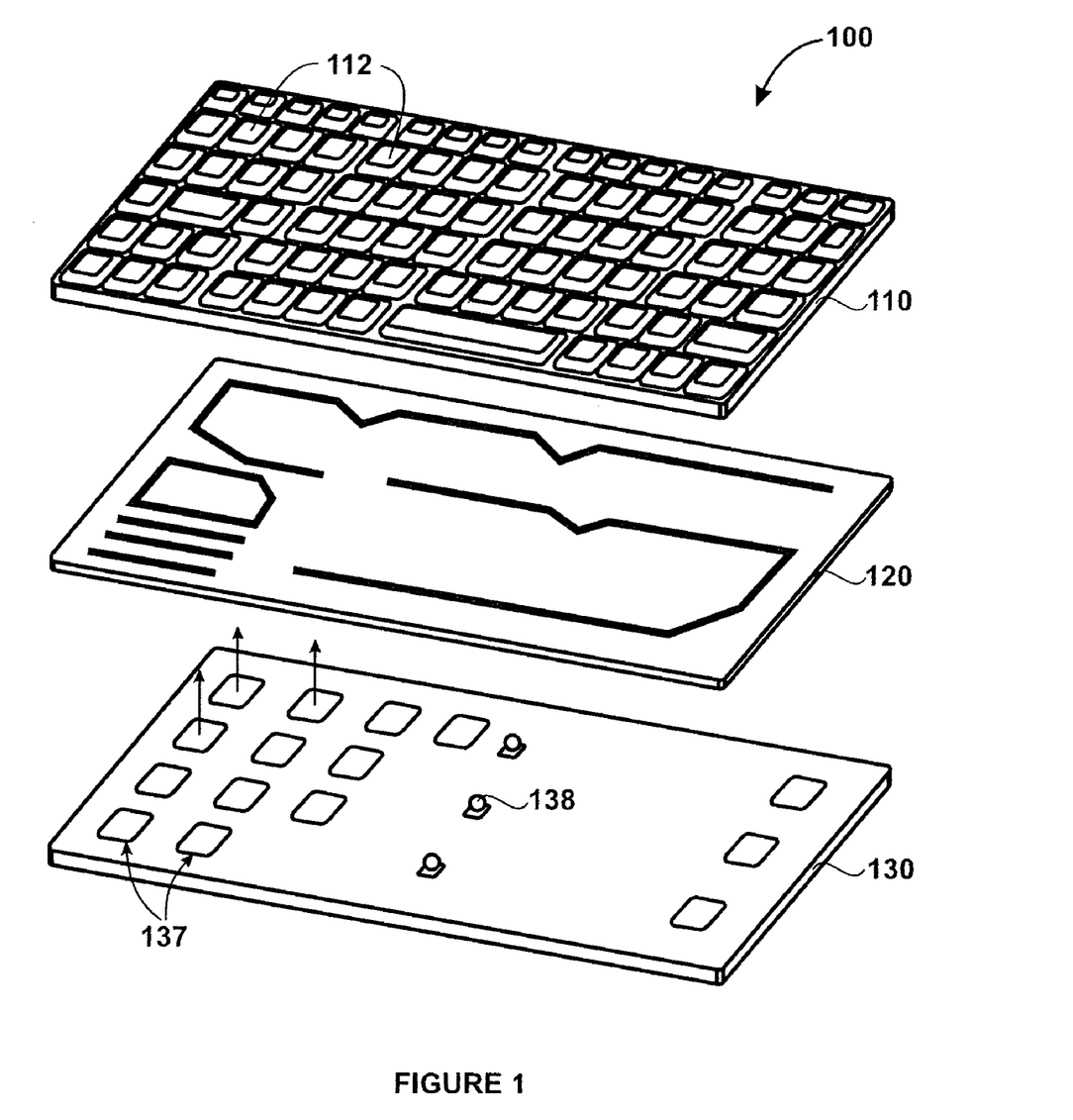
FIG. 1 is a simplified diagram of a keyboard apparatus according to an embodiment of the present invention.

FIG. 1 is a simplified diagram of a keyboard apparatus according to an embodiment of the present invention. This diagram is merely an example, which should not unduly limit the scope of the claims herein. One of ordinary skill in the art would recognize other variations, modifications, and alternatives. As shown, keyboard apparatus 100 includes a housing 110. The housing includes a number of key pads 112 spatially disposed within the housing. Each of the key pads is depressable upon touch by a user. In an embodiment of the present invention, the housing 110 includes at least twenty-six key pads. In a specific embodiment, keyboard apparatus 100 includes twenty-six alphanumeric key pads typically used in a computer keyboard, for example, in a PC or a notebook computer. The keyboard apparatus 100 also includes an optically transparent circuit board 120 coupled to a backside of each of the key pads. In a specific embodiment, each key pad is coupled to the circuit board through a scissor switch, which activates a circuit to identify which particular keypad is being depressed by a user.

In a specific embodiment, key board apparatus 100 also includes a light guide 130 characterized by a planar optically transparent material. The light guide includes a plurality of patterns 137 disposed on the surface region of the light guide and optically coupled to each of the key pads 112. The light guide also includes light source 138, such as a light emitting diode (LED), provided within a center region of the light guide surface region to emit light or electromagnetic radiation. The light or electromagnetic radiation propagates from the light emitting diode through a portion of the thickness of the light guide to one or more of the patterns 137 to direct one or more portions of the electromagnetic radiation to respective key pads for lighting the respective key pads.

Figure 2:
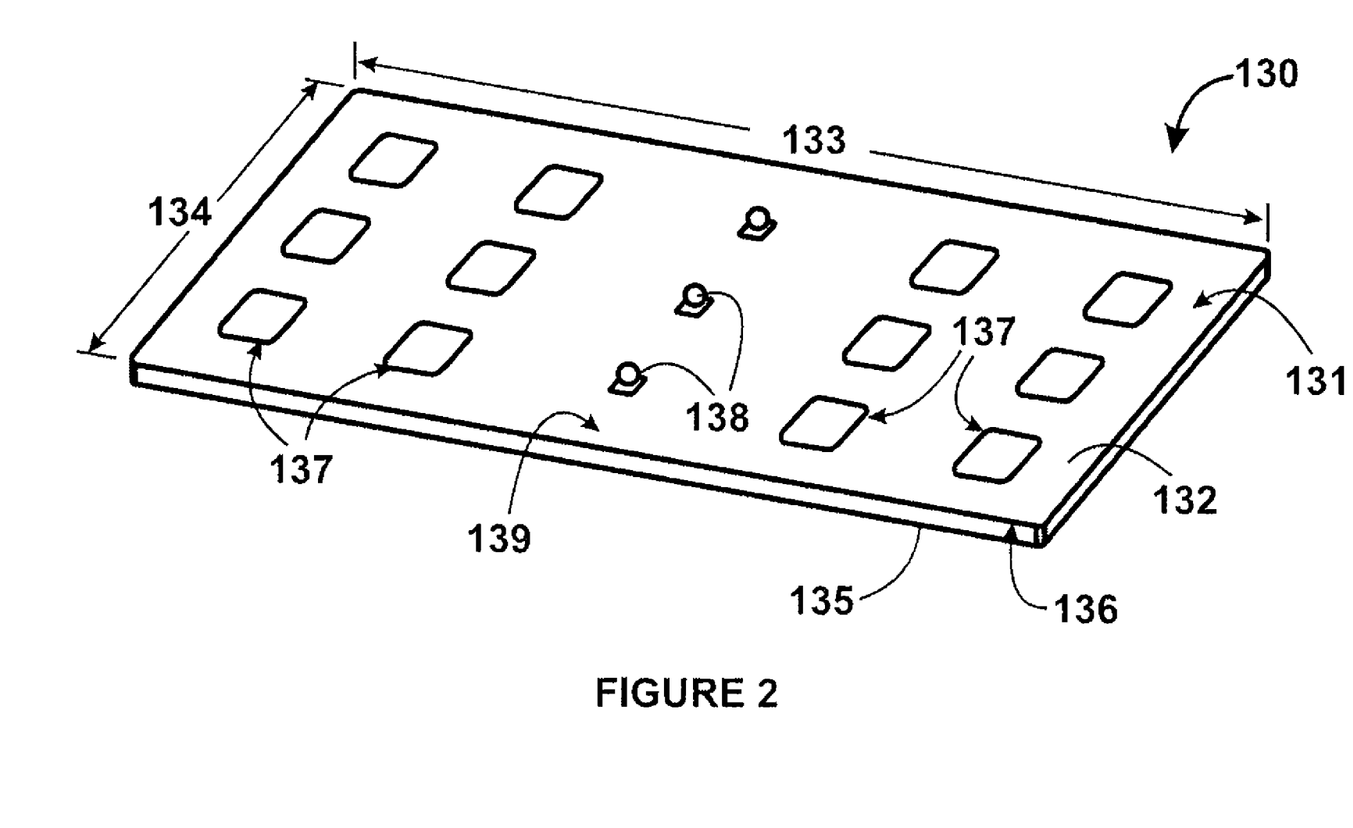
FIG. 2 is a simplified diagram of a light guide according to an embodiment of the present invention.

FIG. 2 is a simplified diagram of a light guide 130 according to an embodiment of the present invention. This diagram is merely an example, which should not unduly limit the scope of the claims herein. One of ordinary skill in the art would recognize other variations, modifications, and alternatives. As shown, light guide 130 includes a planar optically transparent material 131 having a surface region 132, a width 133, a length 134, a backside region 135, and a thickness 136 provided between the surface region 132 and the backside region 135. In a specific embodiment, the thickness is no greater than about 0.6 millimeters. In other embodiments, the light guide can have various thicknesses. Light guide 130 also includes a plurality of patterns 137 formed in the surface region and optically coupled respectively to each of the key pads. The light guide can be constructed using an optically transparent material. For example, in an embodiment, the planar optically transparent material is substantially a plastic material, such as acrylic plastic. In a specific embodiment, the planar optically transparent material is substantially PMMA acrylic plastic, which is Acrylics (Polymethyl-Methacrylate or PMMA), an amorphous thermoplastic which is optically transparent, unaffected by moisture, and offers a high strength-to-weight ratio. Common trade names of acrylic include Plexiglas® manufactured by Altuglas International, Lucite® manufactured by Lucite International, Inc., and Acrylite® manufactured by Cyro Industries. In another embodiment, the planar optically transparent material is a polycarbonate material.

In FIG. 2, light guide 130 also includes a light emitting diodes 138 provided within a center region 139 of the surface region to emit electromagnetic radiation. The electromagnetic radiation propagating from the light emitting diode through a portion of the thickness of the light guide to one or more of the plurality of patterns 137 to direct one or more portions of the electromagnetic radiation to respective key pads for lighting the respective key pads. In another embodiment, the light guide can include a group of light emitting diodes. In an alternative embodiment, the light guide also includes a light source coupled to an edge region of the planar optically transparent material. Of course, one of ordinary skill in the art would recognize other variations, modifications, and alternatives. Further details about the light guide are discussed below.

Figure 3:
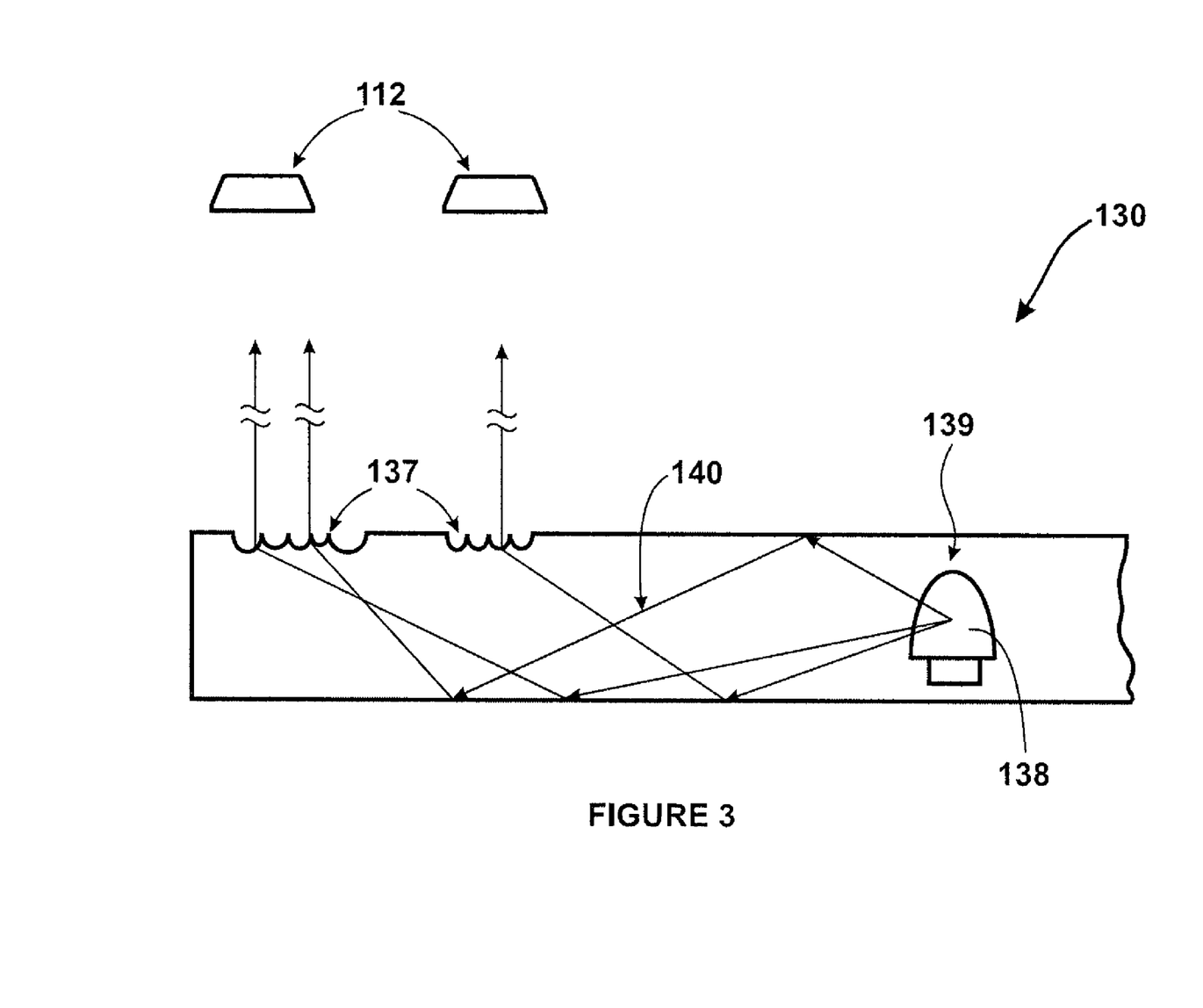
FIG. 3 is a more detailed side view diagram of the light guide according to an embodiment of the present invention.

FIG. 3 is a more detailed side view diagram of the light guide 130 according to an embodiment of the present invention. This diagram is merely an example, which should not unduly limit the scope of the claims herein. One of ordinary skill in the art would recognize other variations, modifications, and alternatives. As shown, in light guide 130, a light emitting diode 138 is provided within a center region 139 of the surface region to emit electromagnetic radiation 140. In an embodiment, the center region excludes an edge region. The electromagnetic radiation 140 propagates from the light emitting diode 138 through a portion of the thickness of the light guide to one or more of the plurality of patterns 137 to direct one or more portions of the electromagnetic radiation to respective key pads, for example 112, for lighting the respective key pads.

Figure 4A:
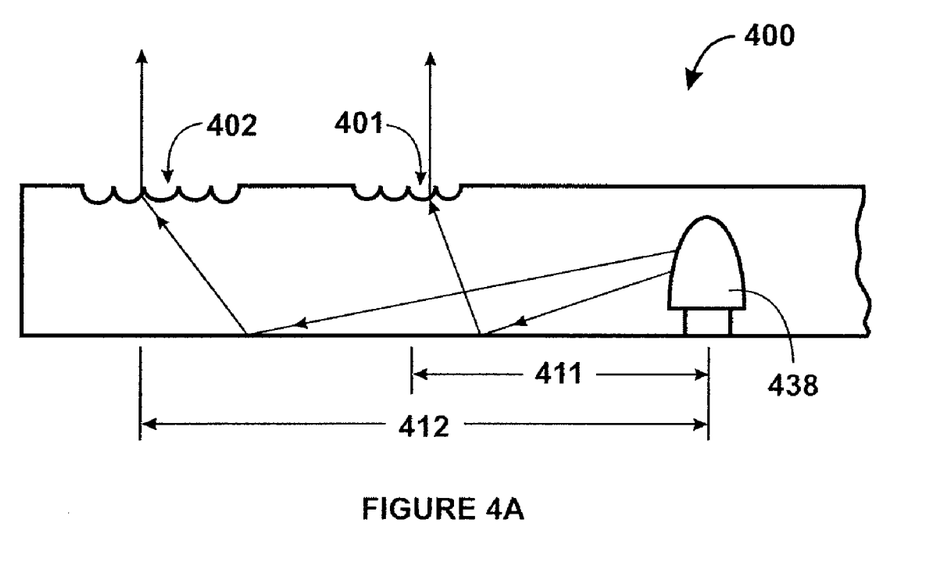
FIGS. 4A and 4B are a more detailed side view diagrams of a patterned region of the light guide according to an embodiment of the present invention.
Figure 4B:
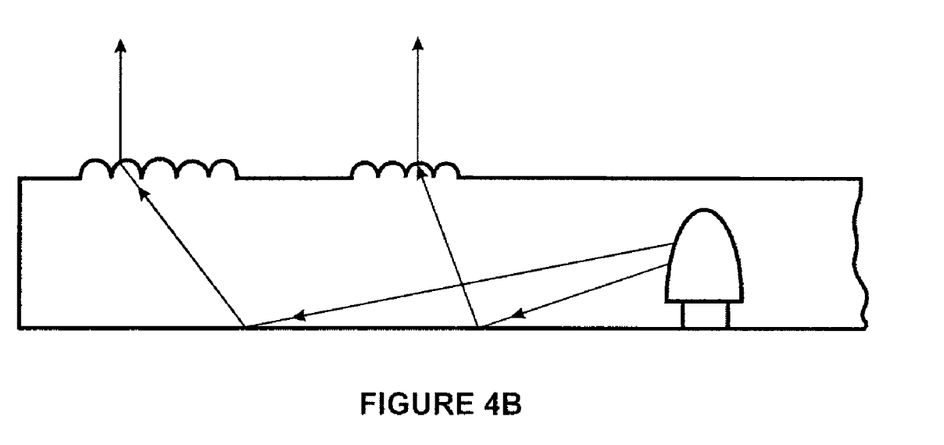

FIG. 4 is a more detailed side view diagram of a patterned region of the light guide according to an embodiment of the present invention. This diagram is merely an example, which should not unduly limit the scope of the claims herein. One of ordinary skill in the art would recognize other variations, modifications, and alternatives. As shown, in light guide 400, the plurality of patterns include a first pattern 401 characterized by a first feature size at a first spatial distance 411 from the light emitting diode and a second pattern 402 characterized by a second feature size at a second spatial distance 412 from the light emitting diode. In this example, the second distance 412 is greater than the first distance 411. In a specific embodiment of the invention, the first feature size directs a first portion of electromagnetic radiation, and the second feature size directs a second portion of electromagnetic radiation. In an embodiment, the first and second feature sizes are selected to cause a uniform distribution of light between the first pattern and the second pattern.

In another embodiment, the first pattern 401 may have a different number of features than the second pattern 402. In yet another embodiment, the first pattern 401 may include features that have a different spatial distribution than the second pattern 402. In an embodiment, the patterns include dimples in a surface region of the light guide, such as shown in FIG. 4A. In another embodiment, the patterns include bumps in a surface region of the light guide, as shown in FIG. 4B. In an alternative embodiment, the first pattern 401 and second pattern 402 may be formed in a second layer of material on the optically transparent material. The second layer of material has different optical properties, such as refractive index, than the optically transparent material of the light guide plate, so that light is directed toward the key caps. Of course, there can be other variation and modifications. In these embodiments, the first and second patterns are selected to cause a uniform distribution of light directed to the corresponding key pads.

Figure 5A:
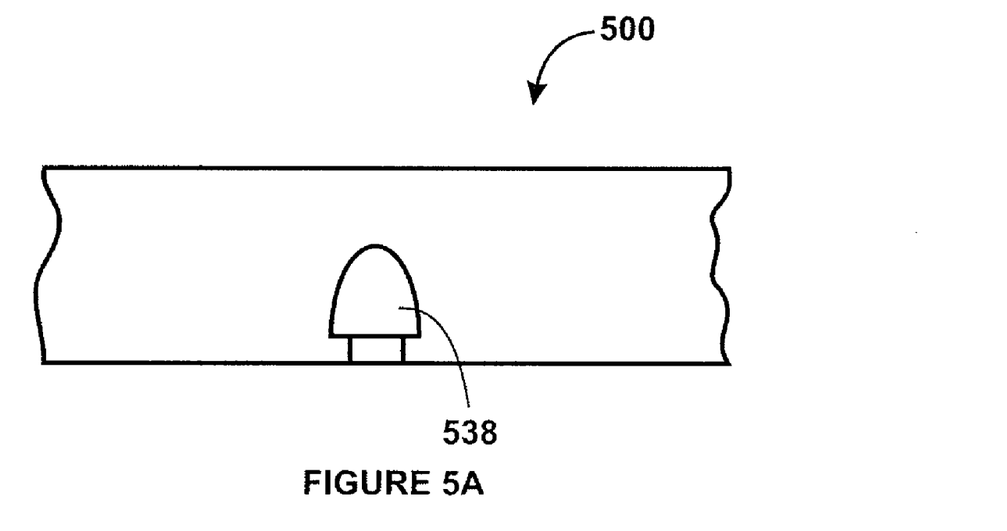
FIGS. 5A-5D are simplified diagrams of light source coupling to the light guide according to an embodiment of the present invention.

FIGS. 5A-5D are simplified diagrams of light source coupling to the light guide according to an embodiment of the present invention. These diagrams are merely examples, which should not unduly limit the scope of the claims herein. One of ordinary skill in the art would recognize other variations, modifications, and alternatives. As shown in FIG. 5A, light emitting diode 538 is embedded in a center region of the light guide 500. In an embodiment, two or more light emitting diodes are embedded in the light guide. In an alternative embodiment, the light emitting diodes can be mounted in an edge region of the light guide.

Figure 5B:
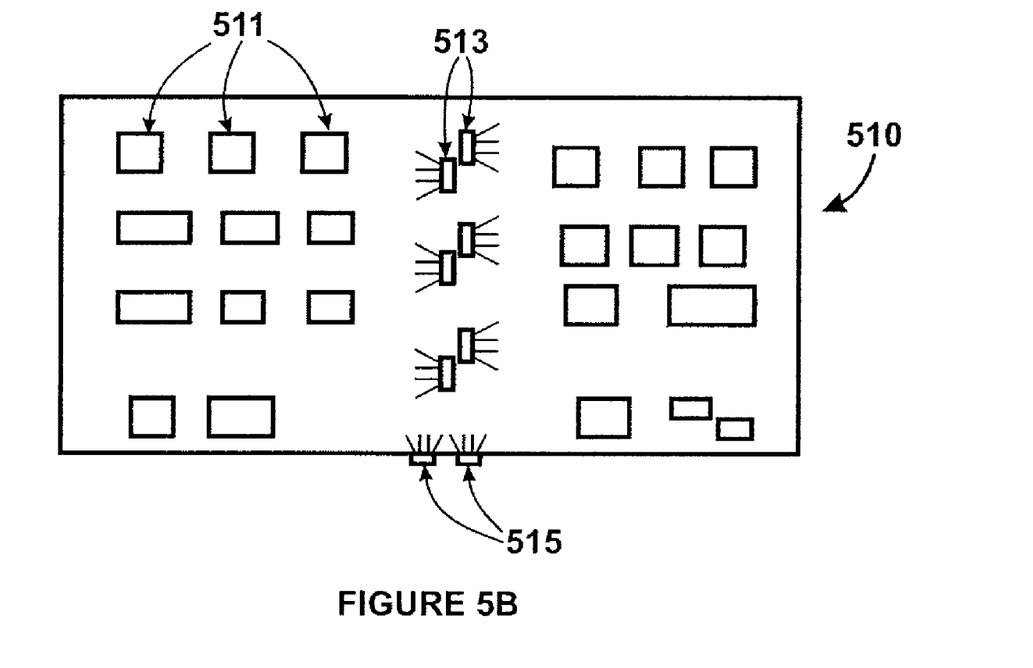

FIG. 5B is a simplified top view diagram of a light guide 510 according to an embodiment of the invention. As shown, light guide 510 includes patterned regions such as 511. In a specific embodiment, each patterned region is aligned to one of a group of key caps, which may represent one of the twenty-six alphabetic keys in a computer keyboard. Depending on the embodiments, the group of key caps may also include control keys and numeric keys, etc. In FIG. 5B, light sources 513, e.g. LEDs, are embedded in a center portion of the light guide. These light sources provide electromagnetic radiation, for example, visible light, to the light guide. The light or radiation is then directed upwards by the patterned regions. In an embodiment, light guide 510 also includes light sources 515 in an edge region. The number and location of the light sources are selected to provide substantially uniform light radiation projected to the key caps. Of course, there can be other variations, modifications, and alternatives.

Figure 5C:
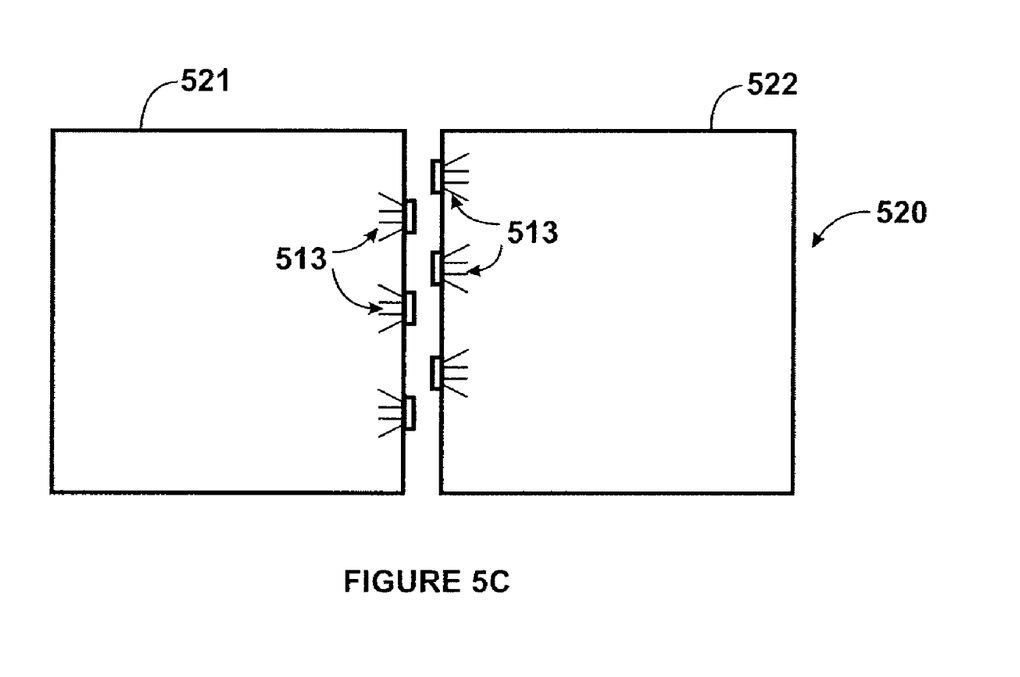
Figure 5D:
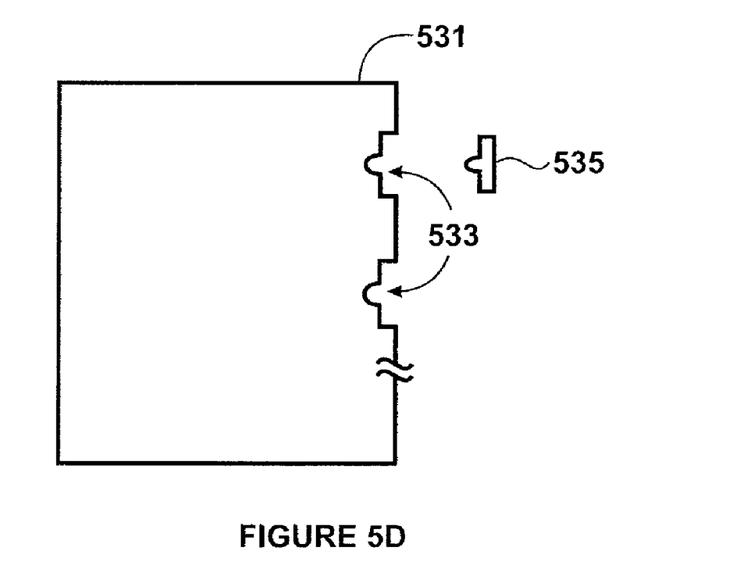

FIG. 5C is a simplified top view diagram of light guide 520 according to another embodiment of the invention. As shown light guide 520 includes two smaller light guides 521 and 522 separated by a gap in a center region of light guide 520. Light sources 513, such as LEDs, are located in the gap region to provide light or radiation to the light guides 521 and 522. The separate light guides provide flexibility in assembling the light guide. This can be seen in FIG. 5D, in which light guide 531 includes notches 533 formed in an edge region. These notches are formed to accept wide angle LEDs 535, or other wide angle light sources. Of course, there can be other variations, modifications, and alternatives.

Figure 6A:
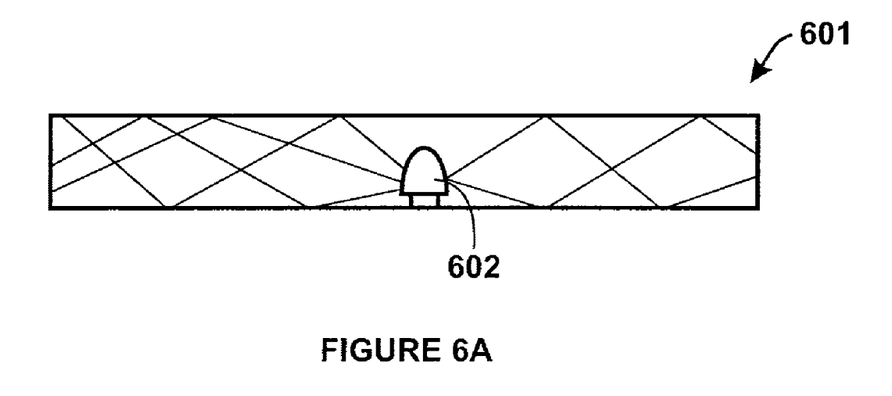
FIGS. 6A-6D are simplified plots of light intensity in the light guide according to an embodiment of the present invention.
Figure 6B:
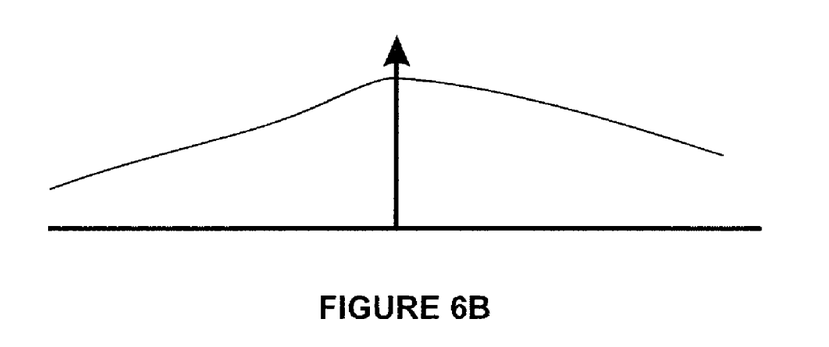
Figure 6C:
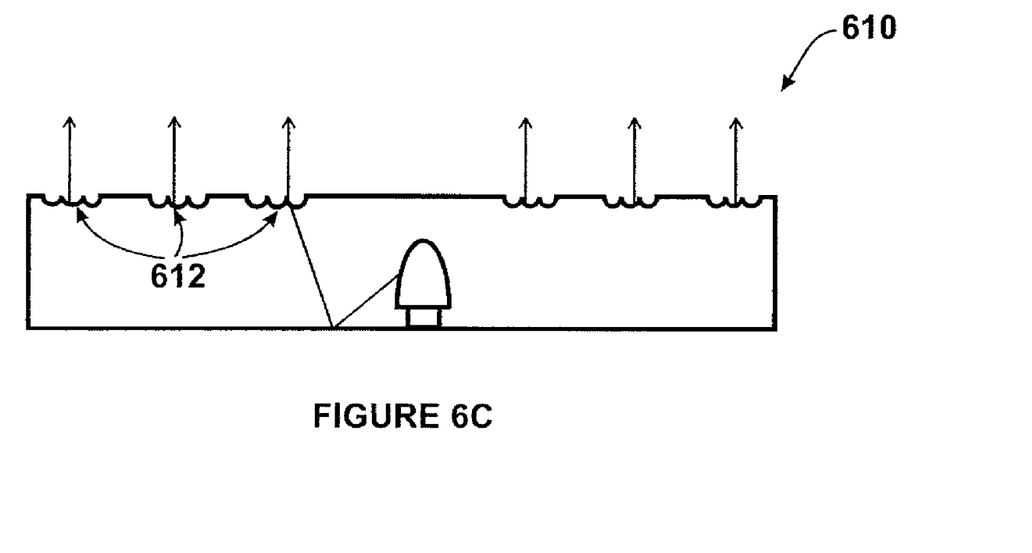
Figure 6D:
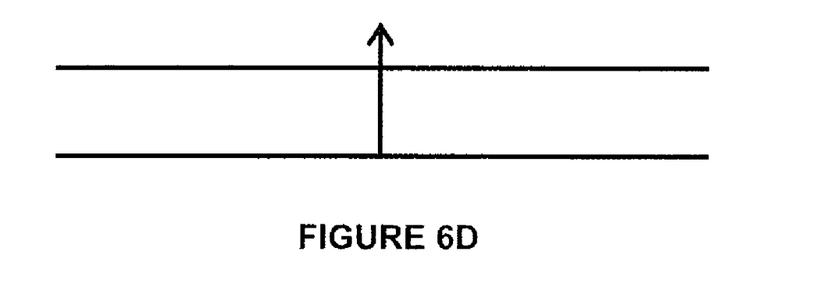

FIGS. 6A-6D are a simplified diagrams showing light intensity against spatial distance for the light guide according to an embodiment of the present invention. These diagrams are merely an example, which should not unduly limit the scope of the claims herein. One of ordinary skill in the art would recognize other variations, modifications, and alternatives. As shown, FIG. 6A shows a planar light guide 601 with a light source 602 in a center region of the light guide. FIG. 6B is a plot of light intensity at various points in the surface region of the light guide 601 as a function of distance from the light guide. Because of total internal reflection, the light is reflected back inside the light guide. It can be seen that light intensity is attenuated as it propagates through the light guide material. That is, the light or electromagnetic radiation is characterized by a first intensity within a vicinity of the center region and a second intensity within a vicinity of an edge region. The first intensity is greater than the second intensity, causing non-uniform light intensity across the light guide 601. In contrast, according to an embodiment of the invention, light guide 610 in FIG. 6C includes patterned regions in which the feature sizes are selected to compensate for the loss in light intensity in the light guide. As a result, light is guided in the patterned regions and emitted from the patterned regions in a substantially uniform manner. This substantially uniform light intensity is shown in the simplified plot in FIG. 6D.

Although the above has been illustrated in terms of specific hardware features, it would be recognized that many variations, alternatives, and modifications can exist. For example, any of the hardware features can be further combined, or even separated. Further details of certain methods according to the present invention can be found throughout the present specification and more particularly below.

Figure 7:
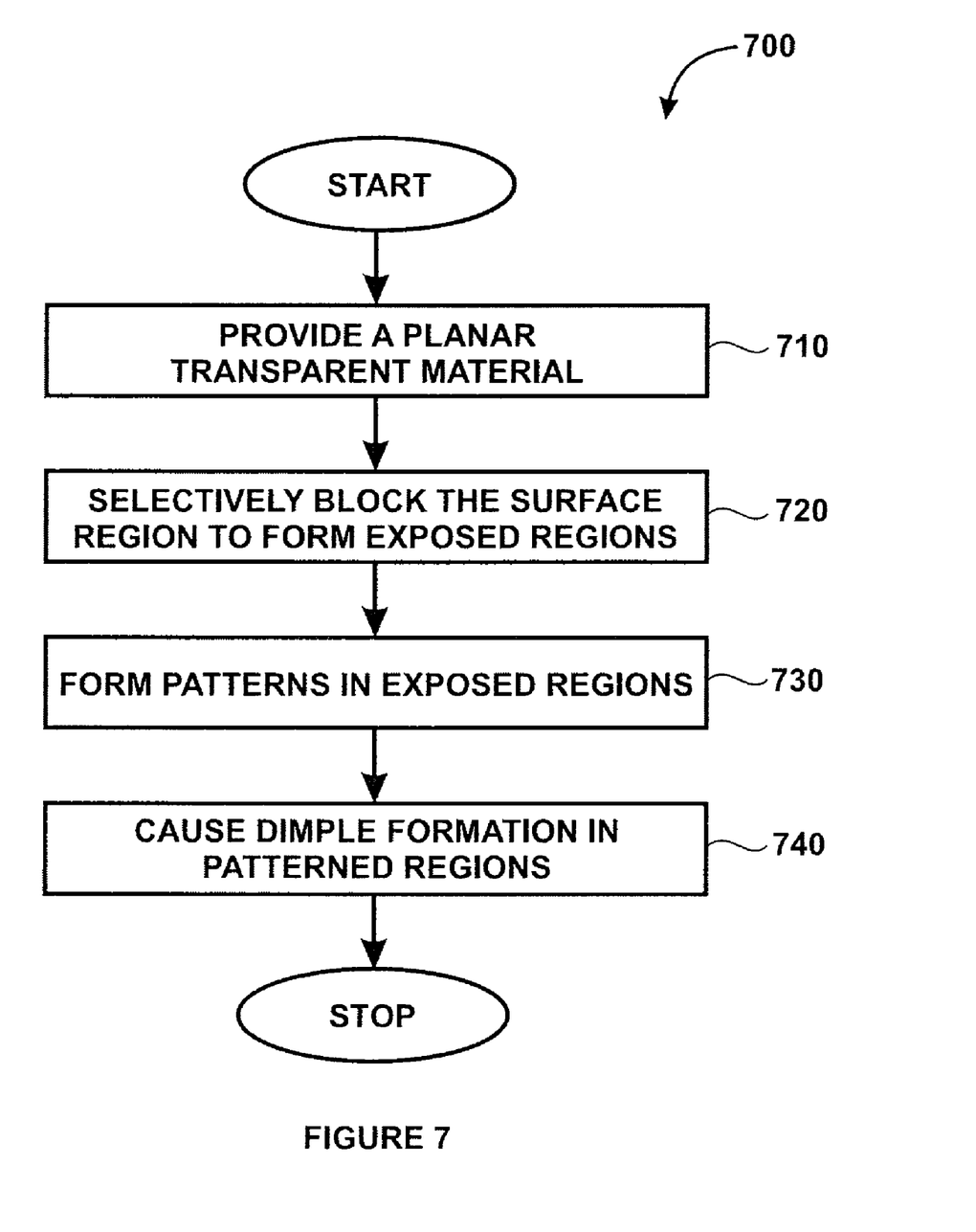
FIG. 7 is a simplified flow diagram of a method of fabricating the light guide according to an embodiment of the present invention.

FIG. 7 is a simplified flow diagram of a method of fabricating the light guide according to an embodiment of the present invention. This diagram is merely an example, which should not unduly limit the scope of the claims herein. One of ordinary skill in the art would recognize other variations, modifications, and alternatives. With reference to FIG. 7, the method can be briefly outlined below.

1. (Process 710) Provide a planar optically transparent material;
2. (Process 720) Selectively block the surface region to form exposed regions;
3. (Process 730) Subject exposed regions to form patterns; and
4. (Process 740) Cause dimple formation in pattern regions for light emission.

Figure 8A:
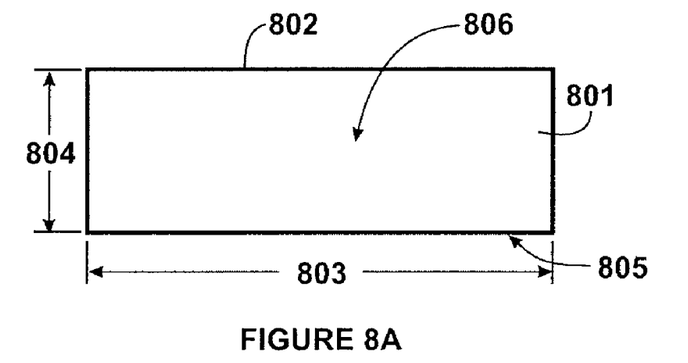
FIGS. 8A through 8C are simplified cross-sectional view diagrams of the method of fabricating the light guide according to an embodiment of the present invention.
Figure 8B:
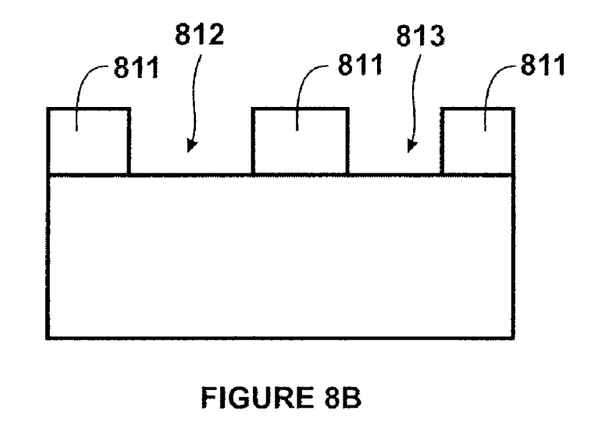
Figure 8C:
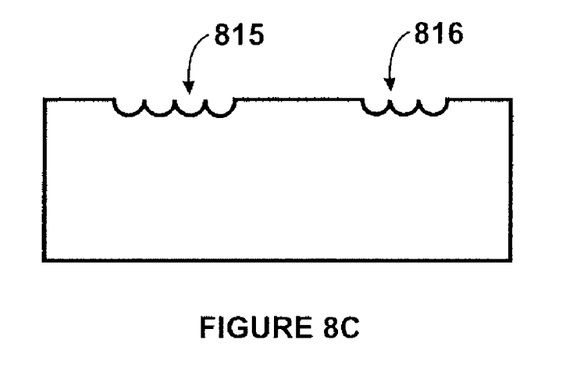

FIGS. 8A through 8C are simplified cross-sectional view diagrams of the method of fabricating the light guide according to an embodiment of the present invention. These diagrams are merely an example, which should not unduly limit the scope of the claims herein. One of ordinary skill in the art would recognize other variations, modifications, and alternatives. With reference to FIG. 7 and FIGS. 8A through 8C, the method of fabricating the light guide according to an embodiment of the present invention can be explained in more detail below. In FIG. 8A, the method including provide a planar optically transparent material. The material has a surface region 802, a width 803, a length 804, a backside region 805, and a thickness 806 provided between the surface region and the backside region. In an embodiment, the planar optically transparent material is substantially a plastic material. In an embodiment, the planar optically transparent material is substantially polycarbonate. In another embodiment, the planar optically transparent material is substantially acrylic plastic (PMMA). In a specific example, the thickness of the planar optically transparent material is no greater than about 0.6 millimeters. In an embodiment, the surface region has a roughness of 0.3 millimeters and less. The planar optically transparent material is characterized by a refractive index such that light inside the material undergoes total internal reflection at the surface region and the backside region. That is, the surface region is characterized as a total internal reflection surface. In a specific embodiment, the backside region is characterized as a total internal reflection surface. In an alternative embodiment, the backside region may include a reflective layer.

In FIG. 8B, the method includes blocking the surface region using a masking material 811, while one or more regions, e.g., 812 and 813 are exposed. In FIG. 8C, the regions 812 and 813 are subjected to a plurality of particles to physically form one or more patterns on the one or more regions that have been exposed while blocking the surface region. This pattern forming process is substantially free from any chemical reaction between the plurality of particles and the exposed regions. For example, the particles may be metal particles, dielectric particles, or other particles of sufficient hardness. In a specific example, the particles are characterized by a size of about 1.0 millimeters and less. The process is repeated to cause formation of the one or more patterns respectively having one or more dimple regions. FIG. 8C shows examples of dimple regions, such as 815 and 816. The one or more dimple regions are configured to cause light or electromagnetic radiation traversing through a portion of the thickness to be emitted from the one or more patterns. In an alternative embodiment, an etching process can be used with the mask material to form the patterned regions. In another embodiment, a maskless process is used to form the patterned regions. In this process, particles made from a hard material can be projected onto the surface of the light guide to form the patterned regions. To obtain substantially uniform light emission to each key pad, the particles can be projected at different energies to form different sizes of dimples. Alternatively, the number or density of the dimples in each of the patterned regions can also be varied in order to achieve uniform light emission intensity.

The above sequence of processes provides a method for fabricating a light guide according to an embodiment of the present invention. As shown, the method uses a combination of processes including a way of forming patterns of dimples or features in a surface region of a planar optically transparent material to direct substantially uniform emission of light to the key pads. Other alternatives can also be provided where steps are added, one or more steps are removed, or one or more steps are provided in a different sequence without departing from the scope of the claims herein.

In another embodiment, the dimple formation methods discussed above can be used to form patterns of dimples on a rigid material. The patterned dimples in the rigid material are then used to form patterns of bumps the light guide. Merely as an example, a mold is made that includes patterns of dimples which can be made using the methods discussed above. Then a suitable light guide material, such as plastic, is melted and injected into the mode. As a result, patterns of bumps are formed in the light guide. In a alternative method, the dimpled rigid material can be pressed onto a plastic sheet, causing patterns of bumps on the plastic sheet. Of course, there can be other variations, modifications, and alternatives.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A keyboard apparatus comprising:
   a housing including a plurality of key pads, including at least twenty-six key pads spatially disposed within the housing, each of the key pads being depressible upon touch by a user;
   an optically transparent circuit board coupled to a backside of each of the key pads;
   a light guide underlying the circuit board and characterized by a planar optically transparent material having a front surface region, a width, a length, and a backside region, and a thickness provided between the surface region and the backside region;
   a plurality of patterns disposed on the front surface region of the light guide and optically coupled respectively to each of the twenty-six key members; and
   a light emitting diode provided within a center region of the surface region to emit electromagnetic radiation, the electromagnetic radiation propagating from the light emitting diode through a portion of the thickness of the light guide to one or more of the plurality of patterns to direct one or more portions of the electromagnetic radiation to respective key pads for lighting the respective key pads.

2. The keyboard of claim 1 wherein the plurality of patterns includes a first pattern having a first plurality of features characterized by a first feature size at a first spatial distance from the light emitting diode and a second pattern having a second plurality of features characterized by a second feature size at a second spatial distance from the light emitting diode, the second distance being greater than the first distance.

3. The keyboard of claim 2 wherein the first feature size directs a first portion of electromagnetic radiation and the second feature size directs a second portion of electromagnetic radiation to cause a uniform distribution of light between the first pattern and the second pattern.

4. The keyboard of claim 1 wherein the center region excludes an edge region.

5. The keyboard of claim 1 wherein the plurality of patterns emit electromagnetic radiation in a substantially uniform manner.

6. The keyboard of claim 1 wherein each of the plurality of patterns are selectively formed to emit electromagnetic radiation in a substantially uniform manner.

7. The keyboard of claim 1 wherein the electromagnetic radiation is characterized by a first intensity within a vicinity of the center region and a second intensity within a vicinity of an edge region; whereupon the first intensity is greater than the second intensity.

8. The keyboard of claim 1 wherein the planar optically transparent material is a substantially plastic material.

9. The keyboard of claim 1 wherein the planar optically transparent material is substantially acrylic plastic.

10. The keyboard of claim 1 wherein the planar optically transparent material is substantially PMMA acrylic plastic.

11. The keyboard of claim 1 wherein the planar optically transparent material is polycarbonate.

12. The keyboard of claim 1 wherein the light emitting diode comprises a plurality of light emitting diodes.

13. The keyboard of claim 1 further comprising a light source coupled to an edge region of the planar optically transparent material.

14. The keyboard of claim 1 wherein the thickness of the light guide is no greater than about 0.6 millimeters.

15. A keyboard apparatus comprising:
   a housing including a plurality of key pads, including at least twenty-six key pads spatially disposed within the housing, each of the key pads being depressible upon touch by a user;
   an optically transparent circuit board coupled to a backside of each of the key pads;
   a light guide underlying the circuit board and characterized by a planar optically transparent material having a front surface region, a width, a length, and a backside region, and a thickness provided between the surface region and the backside region;
   a plurality of patterns disposed on the front surface region of the light guide and optically coupled respectively to each of the twenty-six key members; and
   a light source provided within a center region of the surface region to emit electromagnetic radiation, the electromagnetic radiation propagating from the light emitting diode through a portion of the thickness of the light guide to one or more of the plurality of patterns to direct one or more portions of the electromagnetic radiation to respective key pads for lighting the respective key pads;
   wherein each of the plurality of patterns including a plurality of features having a feature size and a spatial distribution that vary depending on a distance between the pattern and the light source;

wherein the plurality of patterns are configured to provide a substantially uniform light to each of the twenty-six key members.

16. The keyboard of claim 15 wherein the plurality of features comprise dimples.

17. The keyboard of claim 15 wherein the plurality of features comprise bumps.

18. The keyboard of claim 15 wherein the light source comprises a plurality of light emitting diodes positioned in a single column in the center region of the light guide.

19. The keyboard of claim 15 wherein the thickness of the light guide is no greater than about 0.6 millimeters.

20. A keyboard apparatus comprising:
a housing including a plurality of key pads, including at least twenty-six key pads spatially disposed within the housing, each of the key pads being depressible upon touch by a user;
an optically transparent circuit board coupled to a backside of each of the key pads;
a light guide underlying the circuit board and characterized by a planar optically transparent material having a front surface region, a width, a length, and a backside region, and a thickness provided between the surface region and the backside region;
a plurality of surface patterns disposed on the light guide and optically coupled respectively to each of the twenty-six key members;
a light source provided within a center region of the surface region to emit electromagnetic radiation, the electromagnetic radiation propagating from the light emitting diode through a portion of the thickness of the light guide to one or more of the plurality of patterns to direct one or more portions of the electromagnetic radiation to respective key pads for lighting the respective key pads;
wherein the plurality of patterns are configured to provide a substantially uniform light to each of the twenty-six key members.

21. The keyboard of claim 20 wherein the plurality of surface patterns are disposed on an upper surface of the light guide facing the plurality of key pads.

22. The keyboard of claim 20 wherein each of the plurality of surface patterns includes a plurality of features, the features being varied depending on a distance between the pattern and the light source.

23. The keyboard of claim 22 wherein the plurality of features comprise dimples.

24. The keyboard of claim 22 wherein the plurality of features comprise bumps.

* * * * *